US012682639B2

(12) United States Patent
Li et al.

(10) Patent No.: US 12,682,639 B2
(45) Date of Patent: Jul. 14, 2026

(54) METHOD FOR DETECTING URINE FORMED ELEMENTS BASED ON DEEP LEARNING AND CONTEXT RELATION

(71) Applicant: BEIJING XIAOYING TECHNOLOGY CO., LTD., Beijing (CN)

(72) Inventors: Bairui Li, Beijing (CN); Heqing Lian, Beijing (CN)

(73) Assignee: BEIJING XIAOYING TECHNOLOGY CO., LTD., Beijing (CN)

( * ) Notice: Subject to any disclaimer, the term of this patent is extended or adjusted under 35 U.S.C. 154(b) by 269 days.

(21) Appl. No.: 18/413,937

(22) Filed: Jan. 16, 2024

(65) Prior Publication Data

US 2024/0153272 A1     May 9, 2024

Related U.S. Application Data

(63) Continuation of application No. PCT/CN2022/086766, filed on Apr. 14, 2022.

(30) Foreign Application Priority Data

Jul. 15, 2021     (CN) .......................... 202110802795.8

(51) Int. Cl.
*G06V 20/69*          (2022.01)
*G06V 10/75*          (2022.01)
(Continued)

(52) U.S. Cl.
CPC .............. *G06V 20/46* (2022.01); *G06V 10/75* (2022.01); *G06V 10/7715* (2022.01); *G06V 10/82* (2022.01); *G06V 20/698* (2022.01)

(58) Field of Classification Search
CPC .... G06V 20/46; G06V 10/75; G06V 10/7715; G06V 10/82; G06V 20/698; G06V 20/69;
(Continued)

(56) References Cited

U.S. PATENT DOCUMENTS

| | | | | |
|---|---|---|---|---|
| 2019/0147136 A1* | 5/2019 | Lu | .......................... | G06N 20/00 702/19 |
| 2020/0210707 A1* | 7/2020 | Jia | .......................... | G06V 20/47 |
| 2022/0180520 A1* | 6/2022 | Shang | ................... | G06T 7/0014 |

FOREIGN PATENT DOCUMENTS

| | | | | | |
|---|---|---|---|---|---|
| CN | 101713776 | * | 5/2010 | .......... | G01N 33/493 |
| CN | 101713776 A | | 5/2010 | | |

(Continued)

OTHER PUBLICATIONS

International Search Report issued in International Patent Application No. PCT/CN2022/086766; mailed Jun. 24, 2022; 7 pgs.

(Continued)

*Primary Examiner* — Jonathan A Boyd
(74) *Attorney, Agent, or Firm* — HAUPTMAN HAM, LLP

(57) ABSTRACT

A method for detecting urine formed elements based on deep learning and context relation includes performing video capture on a labeled urine sample to obtain a labeled urine video; extracting an image from the labeled urine video to obtain single-frame image data with a time sequence n; and labeling position and category of a formed element on the single-frame image data to obtain a formed element dataset, and dividing the formed element dataset into a training set and a testing set. The method also includes constructing a urine formed element detection and classification model, and comparing and identifying functions, and using the training set and the testing set to train the model. The method further includes performing video capture on a to-be-detected urine sample in the visual field of the microscopic imaging device to obtain a to-be-detected urine video.

9 Claims, 8 Drawing Sheets

(51) Int. Cl.
   *G06V 10/77*          (2022.01)
   *G06V 10/82*          (2022.01)
   *G06V 20/40*          (2022.01)
(58) Field of Classification Search
   CPC ........... G06T 7/277; G06T 2207/10016; G06T
                  2207/10056; G06T 2207/20081; G06T
            2207/20084; G06T 7/0012; G06T 7/246;
                        G06T 7/66; G06T 7/73; G06T
               2207/30004; G06N 3/045; G06N 3/08;
                                        G06F 18/241
   See application file for complete search history.

(56)                    References Cited

FOREIGN PATENT DOCUMENTS

| CN | 110473166 | A |   | 11/2019 |              |          |
|----|-----------|---|---|---------|--------------|----------|
| CN | 110852283 | A |   | 2/2020  |              |          |
| CN | 112036334 | A |   | 12/2020 |              |          |
| CN | 112598620 |   | * | 4/2021  | .............. | G06K 9/46 |
| CN | 112598620 | A |   | 4/2021  |              |          |
| CN | 113033657 | A |   | 6/2021  |              |          |
| CN | 113256637 | A |   | 8/2021  |              |          |

OTHER PUBLICATIONS

First Office Action issued in Chinese Patent Application No.
202110802795.8; mailed Aug. 20, 2021; 22 pgs.

* cited by examiner

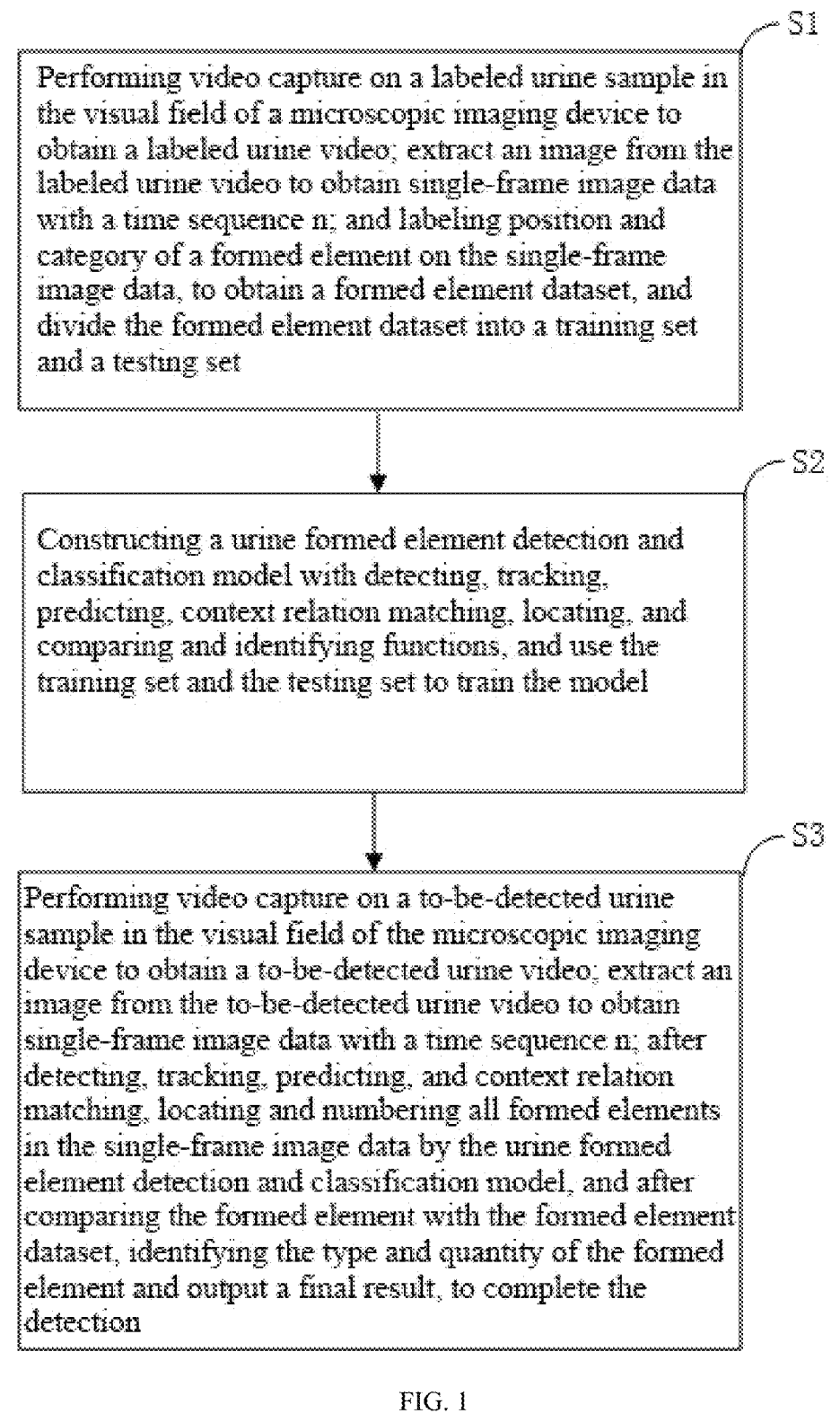

~S1

Performing video capture on a labeled urine sample in the visual field of a microscopic imaging device to obtain a labeled urine video; extract an image from the labeled urine video to obtain single-frame image data with a time sequence n; and labeling position and category of a formed element on the single-frame image data, to obtain a formed element dataset, and divide the formed element dataset into a training set and a testing set

~S2

Constructing a urine formed element detection and classification model with detecting, tracking, predicting, context relation matching, locating, and comparing and identifying functions, and use the training set and the testing set to train the model

~S3

Performing video capture on a to-be-detected urine sample in the visual field of the microscopic imaging device to obtain a to-be-detected urine video; extract an image from the to-be-detected urine video to obtain single-frame image data with a time sequence n; after detecting, tracking, predicting, and context relation matching, locating and numbering all formed elements in the single-frame image data by the urine formed element detection and classification model, and after comparing the formed element with the formed element dataset, identifying the type and quantity of the formed element and output a final result, to complete the detection

FIG. 1

METHOD FOR DETECTING URINE FORMED ELEMENTS BASED ON DEEP LEARNING AND CONTEXT RELATION

CROSS REFERENCE

The present application is a Continuation of International Application No. PCT/CN2022/086766 filed Apr. 14, 2022, which claims priority to a Chinese patent application No. 202110802795.8, filed on Jul. 15, 2021, and entitled "A Method for Detecting Urine Formed Elements Based on Deep Learning and Context Relation", the entireties of which are herein incorporated by reference.

TECHNICAL FIELD

The present application relates to the technical field of computing, deducing and counting, in particular to a method for detecting urine formed elements based on deep learning and context relation.

BACKGROUND

The urine formed elements refer to generic terms of substances that are permeated, excreted, shed, concentrated and crystallized in visible forms from the urinary system. The analysis of urine formed elements refers to examination of the urine formed elements using a microscope or a dedicated device, to identify various pathological components such as cells, casts, crystals, bacteria and parasites in urine, and to assist in the diagnosis, localization, differential diagnosis, and prognosis of urinary system diseases.

Urine formed element detection belongs to flowing liquid detection, and the position of the formed element in each frame may change under the same microscopic imaging visual field, so it is easy to be missed for detection.

The existing methods for detecting the urine formed elements mainly comprise the following:

(1) Dry chemical analysis method: it is constituted by a module containing a dry chemical reagent attached to a sturdy plastic or paper strip. Various routine chemical examination contents in the urine react with the dry chemical reagent, so that the color of the module is changed, and the darkness or lightness of the color is directly proportional to the concentration of the corresponding chemical component in the urine.

(2) Instrument inspection method: it is represented by flow cytometry for component analysis. A flow cytometer utilizes the formed elements in the urine, which is dyed with a fluorochrome (such as phenanthridine and cyanogen carboxylate) dye. Under the action of sheath flow liquid, the dyed formed elements form a single column and quickly pass through an argon laser detection region. An instrument detects changes in fluorescence, scattered light and electrical impedance.

(3) Manual microscopic method: it is a golden standard for detecting the urine formed elements. Doctors usually need to observe an entire urine slide under a 40x objective lens of the microscope, and it usually takes several minutes to tens of minutes.

However, the existing detecting methods have some deficiencies. The dry chemical analysis method may not replace microscopic examination of pathological urine specimens, and the detection of white blood cells, casts and crystals belongs to indirect detection, it is difficult to determine the morphological characteristics of urine red blood cells; the instrument inspection method has certain errors and still requires manual microscope reexamination; and the manual microscopic method consumes time and manpower, and is prone to human errors.

In addition, among existing algorithms for detecting the urine formed elements, an image segmentation method may only obtain a single formed element, with extremely poor generalization performance, severe interference from factors such as light, contrast and color, weak generalization ability, slow speed, and failure to consider the problem of imbalanced cell categories, and serious identification bias is caused, so that cells in the tail category may not be correctly identified, and it does not have the significant practical application value.

Therefore, there is an urgent need for a fast and high-precision method for detecting urine formed elements.

SUMMARY OF THE INVENTION

A purpose of the present application is to solve a problem of missed and repeated detection caused by an easily changed position of urine formed elements in the visual field of a microscope, and provide a method for detecting urine formed elements based on deep learning and context relation. Based on a Transformer technology, a Kalman filtering based target tracking technology is applied to count the urine cells, interference factors such as long tail distribution and light are fully considered, the above problem is solved to some extent while the balance between speed and accuracy is achieved, and the present application has the relatively high clinical application value.

The present application provides a method for detecting urine formed elements based on deep learning and context relation, comprising the following steps:

S1, establishing a formed element dataset: performing video capture on a labeled urine sample in the visual field of a microscopic imaging device to obtain a labeled urine video; extracting an image from the labeled urine video to obtain single-frame image data with a time sequence n; and labeling position and category of a formed element on the single-frame image data to obtain the formed element dataset, and dividing the formed element dataset into a training set and a testing set;

S2, establishing a urine formed element detection and classification model: constructing a urine formed element detection and classification model with detecting, tracking, predicting, context relation matching, locating, and comparison and identifying functions, and using the training set and the testing set to train the model;

S3, detecting a to-be-detected urine: performing video capture on a to-be-detected urine sample in the visual field of the microscopic imaging device to obtain a to-be-detected urine video; extracting an image from the to-be-detected urine video, to obtain single-frame image data with a time sequence n; after detecting, tracking, predicting, and context relation matching, locating and numbering all formed elements in the single-frame image data by the urine formed element detection and classification model, and after comparing the formed element with the formed element dataset, identifying the type and quantity of the formed element and outputting a final result, to complete the detection.

The method for detecting urine formed elements based on deep learning and context relation provided by the present application, as a preferred mode, Step S2 comprises:

S21, constructing model: constructing a Transformer detecting model, a tracking model, and an identifying model, and using the training set and the testing set to perform model training;

S22, detecting the first frame image: detecting single-frame image data with a time sequence of 1 by the Transformer detecting model, to obtain a detection frame coordinate $(x_1, y_1, w_1, h_1)$ of a target and a corresponding coordinate box change rate $(dx_1, dy_1, dw_1, dh_1)$, wherein $(x_1, y_1)$ is a center point coordinate of a single-frame image with the time sequence of 1, $w_1$ is a width of a single-frame image detection frame with the time sequence of 1, and $h_1$ is a height of the single-frame image detection frame with the time sequence of 1;

S23, tracking image data: inputting the detection frame coordinate $(x_1, y_1, w_1, h_1)$ and the coordinate box change rate $(dx_1, dy_1, dw_1, dh_1)$ into the tracking model to initialize the tracking model;

S24, extracting image: extracting single-frame image data with a time sequence of n, wherein n is 2 initially, then detecting image in Step S25, and predicting state in Step S26;

S25, detecting image: detecting the single-frame image data by the Transformer detecting model, to obtain a detection frame coordinate $(x_n, y_n, w_n, h_n)$ of a target and a corresponding coordinate box change rate $(dx_n, dy_n, dw_n, dh_n)$, and entering Step S27, wherein $(x_n, y_n)$ is a center point coordinate of a single-frame image with the time sequence of n, $w_n$ is a width of a single-frame image detection frame with the time sequence of n, and $h_n$ is a height of the single-frame image detection frame with the time sequence of n;

S26, predicting state: predicting the state of the detection frame coordinate of the previous single-frame image by the tracking model to obtain a detection frame predicted coordinate $(x_c, y_c, w_c, h_c$, and entering Step S27;

S27, matching the context relation: matching the detection frame coordinate $(x_n, y_n, w_n, h_n)$ with the detection frame predicted coordinate $(x_c, y_c, w_c, h_c)$, and classifying the detection frame as a matching target, a possible missing target and a missing target according to the matching result;

S28, updating the tracking model: inputting the matching target, the possible missing target, and the missing target into the tracking model for updating the tracking model, and determining whether all the single-frame image data detecting and tracking are completed, if no, n=n+1, returning to Step S24, and if yes, acquiring all matching targets; and S29, matching target identification: identifying all the matching targets by the identifying model to obtain and then output the type and quantity of the formed element, thus completing model training.

The method for detecting urine formed elements based on deep learning and context relation provided by the present application, as a preferred mode, in Step S21, the Transformer detecting model comprises an encoder, a decoder, and a multi-layer neural network mapping layer that are set sequentially;

the encoder comprises at least two multi-head self-attention modules connected sequentially, the encoder is used to divide the single-frame image data into k image blocks, which are linearly transformed into feature expression of the image blocks by a query matrix Qi, a value matrix Vi, and a keyword matrix Ki of the first multi-head self-attention module, the feature expression is superposed with a feature of the multi-head self-attention module and then input into the next multi-head self-attention module, until the final feature expression of the image blocks is obtained by the last multi-head self-attention module, and the final feature expression of the image blocks is superposed with position encoding to obtain a decoder input feature;

the decoder comprises at least one multi-head self-attention module connected sequentially, the decoder is used to decode the decoder input feature by at least two multi-head self-attention modules to obtain a decoded feature vector; and the multi-layer neural network mapping layer is used to calculate the decoded feature vector to obtain a corresponding feature vector, and linearly map to obtain the detection frame coordinate $(x_n, y_n, w_n, h_n)$ and the corresponding coordinate box change rate $(dx_n, dy_n, dw_n, dh_n)$.

The method for detecting urine formed elements based on deep learning and context relation provided by the present application, as a preferred mode, the pixel of the single-frame image data is 608*608, wherein k is 16, and the pixel of the image block is 38*38;

the encoder comprises four multi-head self-attention modules connected sequentially, the decoder comprises four multi-head self-attention modules connected sequentially, and the multi-layer neural network is a three-layer fully connected layer neural network;

the detection result of the Transformer detecting model is:

$$PE_{(pos,2i)}=\sin(pos/10000^{2i/d_{model}})$$

$$PE_{(pos,2i+1)}=\cos(pos/10000^{2i/d_{model}});$$

wherein, $PE_{(pos,2i)}$ is image encoding of $(pos, 2i)$, pos is a position number of a single-frame image in the entire image, i is a dimension of the position encoding, and $d_{model}$ is a total dimension of the positional encoding; and the detection result as an object to be matched for the tracking model is input into the tracking model.

The method for detecting urine formed elements based on deep learning and context relation provided by the present application, as a preferred mode, in Step S21, the tracking model is a tracking model based on Kalman filtering prediction or a tracking model uses any one of the following algorithms: SSD algorithm, FPN algorithm, Fast R-CNN algorithm, faster R-CNN algorithm, mask R-CNN algorithm, efficentNet algorithm, YOLO/v2/v3/v4/v5 algorithm and RetianNet algorithm.

The method for detecting urine formed elements based on deep learning and context relation provided by the present application, as a preferred mode, in Step S21, the states of the Kalman filtering in the tracking model comprises: the center point coordinate $(x_n, y_n)$, the width and height of the detection frame $(w_n, h_n)$, the change rate of the center point coordinate $(dx_n, dye)$, and the change rate of the width and height of the detection frame $(dw_n, dh_n)$.

The method for detecting urine formed elements based on deep learning and context relation provided by the present application, as a preferred mode, in Step S21, the tracking model adopts the following formula:

$$x_k=A*x_{k-1}+B*u_k+w_{k-1}$$

$$z_k=H*x_k+v_k;$$

wherein, $x_k$ is a system state matrix, $z_k$ is a state matrix observation quantity, A is a state transition matrix, B is a control input matrix, H is a state observation matrix, $w_{k-1}$ is a process noise, and $v_k$ is a measurement noise.

The method for detecting urine formed elements based on deep learning and context relation provided by the present application, as a preferred mode, in Step S22, the target comprises a cell and a crystal.

The method for detecting urine formed elements based on deep learning and context relation provided by the present application, as a preferred mode, in Step S27, the possible missing target is a target that is not matched for 5 times or less, the missing target is a target that is not matched for more than 5 times, and the missing target comprises a moving-too-fast target and a defocused target; and the matching method comprises: an Manhattan distance calculation method, a representation similarity calculation method, and a Hungarian algorithm.

The method for detecting urine formed elements based on deep learning and context relation provided by the present application, as a preferred mode, in Step S21, the identifying method of the identifying model is as follows:

A, grouping: dividing all the matching targets into four groups and setting another category for each group respectively; and B, deducing: when a real category of a sample is in other groups, the category of this group is the other category, selecting the category with the highest probability within all groups.

The specific method for constructing the model in the present application is as follows:

1. Constructing a Single-Frame Urine Image Detection and Classification Model.

Firstly, an image of 608*608 is input, and then equally divided into 16 parts according to the pixel size of 38*38. These 16 image blocks, as the image blocks of which attention coefficients are needed to be calculated, are sent into the "multi-head self-attention (M-SELF-ATTENTION)" modules of the encoder to calculate the correlations between this image block and other image blocks. For each image block, there is a query matrix Qi, a value matrix Vi, and a keyword matrix Ki. The operation rules of the "M-SELF-ATTENTION" module are as follows:

(1) For the current image block, its query matrix Qi is set and the 38*38 image block is vectorized as the value matrix Vi, a matrix operation is performed on Qi and Vi to obtain a linearly transformed query matrix Qi*.

(2) For other image blocks, the keyword matrices Ki are set separately, the current value matrix Vi is used to perform the matrix operation on Ki and Vi to obtain linearly transformed keyword matrices Ki*.

(3) Based on Qi* calculated in (1), 16 matrices calculated based on (2) are combined into a large matrix K*, a correlation matrix W is obtained by a matrix multiplication operation of Q* and K*, and a correlation (0-1) between this image block and other image blocks is obtained by normalizing W.

(4) The correlation matrix is multiplied by the value matrix Vi of other image blocks to obtain weighted features based on the different image blocks. The features are mapped by a fully connected layer, to obtain a final feature expression of the image block, wherein the fully connected layer is used to control a feature dimension of the final expression.

(5) The final feature is superimposed with the features (or images) input into "multi-head self-attention", to obtain a new feature, which is used as an input of the next level of "multi-head self-attention". The above new feature is sent into the second level of the "multi-head self-attention" module.

The above operations are repeated to obtain the final feature within the encoder. The entire encoding process performs four levels of "multi-head self-attention" calculation in total. Then, decoding is performed, and position information of the feature obtained by the encoder is encoded. The position code is "superposed" with the feature obtained by the encoder, to obtain a final input feature of a decoder. This feature is sent into the decoder containing four levels of "multi-head attention" operations in total, which is similar to the calculation process of the "multi-head attention" operation of the encoder. Finally, the decoder outputs a decoded feature vector. The feature vector is sent into the three-layer fully connected layer corresponding to the detection frame, to obtain a feature vector of this task. The feature vector is linearly mapped respectively, to obtain coordinate and confidence of the detection frame. A detection result is used as an object to be matched for the tracking model and input into the tracking model.

$$PE_{(pos,2i)}=\sin(pos/10000^{2i/d_{model}})$$

$$PE_{(pos,2i+1)}=\cos(pos/10000^{2i/d_{model}});$$

Wherein pos is a position number of the image block in the entire image, i is a dimension of the position code, and $d_{model}$ is a total dimension of the positional code.

2. Tracking Model

In each frame of the input video, based on effective information of the target obtained in Step 1, a tracking model based on Kalman filtering prediction is established.

In addition to the model proposed in this embodiment, detection algorithms such as SSD, FPN, Fast R-CNN, faster R-CNN, mask R-CNN, efficentNet, YOLO/v2/v3/v4/v5, and RetianNet may also be comprised.

2.1. Tracking Model Initialization

The tracking model using Kalman filtering as the principle is constructed, and an initial tracking target is obtained from the first frame of the cell detection result obtained in Step 1. The detected position information (w, y, w, h) is used as an initialization state, to initialize the tracking model. The states of the selected model have eight state variables, comprising the center point coordinate (x, y), the width and height of the detection frame (w, h), the change rate of the center point coordinate (dx, dy), and the change rate of the width and height of the coordinate box (dw, dh). When parameters are initialized, conventional experience is used to initialize a state transition matrix and the like.

$$x_k=A^*x_{k-1}+B^*u_k+w_{k-1} \tag{1}$$

$$z_k=H^*x_k+v_k \tag{2}$$

2.2. Predicting State

Firstly, the model is already initialized in 2.1, and the tracking model predicts the state of the tracked target, to obtain a predicted target state of the model, namely new (w, y, w, h, dx, dy, dw, dh).

$x_k$→system state matrix, . . . , $z_k$→observation quantity of state matrix (actual measurement)

A→state transition matrix, . . . , B→control input matrix

H→state observation matrix $w_{k-1}$→process nois, . . . , $v_k$→measurement noise 2.3. Target Matching (Context Relation)

In each input frame, Step 1 is used to obtain the detected target to be matched in this frame, the detected target is matched with the predicted target, to obtain a result of pairwise matching. For the target tracked in the previous frame that does not have a matching object in this frame, it is marked as a "possible missing target". For the target that is detected in this frame but not matched with the target tracked in the previous frame, it is marked as a new tracking target, and its state is initialized by the Kalman filtering model. If a certain target is marked as the "possible missing target" for more than 5 frames, it is marked as a "missing target" and no longer be tracked.

Target Matching Method:

Manhattan Distance

Manhattan distance—a distance between two points in the north-south direction plus a distance between the two points in the east-west direction, the screen is composed of pixels which are integers, and the coordinates of the points are also integers. Euclidean distance is a floating-point operation, which is slow in speed and has accumulated errors. The Manhattan distance only needs addition and subtraction, thus the efficiency is improved and errors are reduced.

Representation Similarity

Due to the randomness of Kalman filtering prediction, a matching method based on similarity calculation is introduced. A SiameseNet is used to calculate the similarity between the target detected in the current frame and the target tracked in the previous frame, to obtain the similarity between the different targets.

Hungarian Algorithm (Binary Matching)

The Manhattan distance is used to perform distance calculation on the target detected in the current frame and the target tracked in the previous frame, to obtain a pairwise distance between different targets, a weight matrix of the Hungarian algorithm is obtained by weighting the distance with the representation similarity, and the pairwise matching of the optimal targets is performed, to obtain a matching result.

2.4. Updating the Tracking Model Parameter

For all tracked targets in this frame, its state and model parameters are updated. The parameters and states of the tracking model for the new tracked target are obtained, 2.2 to 2.4 is repeated until the end.

3. Identifying Model

The identifying model is based on the detection frame of Step 1.

Due to the relatively small number of abnormal cells compared to all cells in the target, and the varying number of samples collected by the different abnormal cells, the number of cells in the foreground, background, and different categories follows long tail distribution, which seriously affects the identification performance of the model. A method of grouping classifiers is adopted to alleviate this situation.

The cells may be divided into four groups (comprising a background category) according to the different numbers.

Another category is added to the different groups, namely when a real category of a sample is in other groups, the category of this group is the other category.

The category with the highest probability within all groups is selected during deducing.

By adopting this method, the weight difference of the classifiers on different categories is relatively small, which effectively alleviate the serious impact of the long tail distribution on the identifying model.

4. Locating the Effective Component

Based on the above detecting, identifying and tracking model, a unique id (id is started from zero and increased sequentially with the number of the tracked targets) is assigned to each tracked object and the category of the target is identified. Ultimately, the effective number and category of the cells in the urine may be obtained.

The present application has the following advantages:

(1) The present application is based on the Transformer technology and applies the Kalman filtering based target tracking technology to count the urine cells. The interference factors such as long tail distribution and light are fully considered, the above problem is solved to some extent while the balance between speed and accuracy is achieved, and present application has the relatively high clinical application value.

(2) This method is aimed at the fluidity and the phenomenon of layering (the different cells are located at different heights and need to be focused layer by layer) of the urine. The simple target detection frame by frame may cause the repeated detection, and the layering may lead to the missed detection in the target detection frame by frame. By adopting the method based on tracking target, the above problems may be effectively solved, individual component is accurately located and tracked, the speed is fast, and the real-time result may be obtained, which not only reduces labor costs, but also reduces regional medical disparities and effectively alleviates the problem of long tail identification caused by the imbalanced urine cell categories, thus meeting the needs of clinical applications.

BRIEF DESCRIPTION OF THE DRAWINGS

FIG. 1 is a flow diagram of Embodiments 1-2 of a method for detecting urine formed elements based on deep learning and context relation;

DETAILED DESCRIPTION

Technical schemes in embodiments of the present application are clearly and completely described below in combination with drawings in the embodiments of the present application. Apparently, the described embodiments are only a part of the embodiments of the present application, not all of the embodiments.

Embodiment 1

As shown in FIG. 1, a method for detecting urine formed elements based on deep learning and context relation comprises the following steps:

S1, establishing a formed element dataset: performing video capture on annotated labeled urine sample in the visual field of a microscopic imaging device to obtain annotated labeled urine video; extracting an image from the labeled urine video to obtain single-frame image data with a time sequence n; and labeling position and category of a formed element on the single-frame image data to obtain the formed element dataset, and dividing the formed element dataset into a training set and a testing set;

S2, establishing a urine formed element detection and classification model: constructing a urine formed element detection and classification model with detecting, tracking, predicting, context relation matching, locating, and comparing and identifying functions, and using the training set and the testing set to train the model;

S3, detecting a to-be-detected urine: performing video capture on a to-be-detected urine sample in the visual field of the microscopic imaging device to obtain a to-be-detected urine video; extracting an image from the to-be-detected urine video to obtain single-frame image data with a time sequence n; after detecting, tracking, predicting, and context relation matching, locating and numbering all formed elements in the single-frame image data by the urine formed element detection and classification model, and after comparing the formed element with the formed element dataset, identifying the type and quantity of the formed element and outputting a final result, to complete the detection.

Embodiment 2

Figure 2:
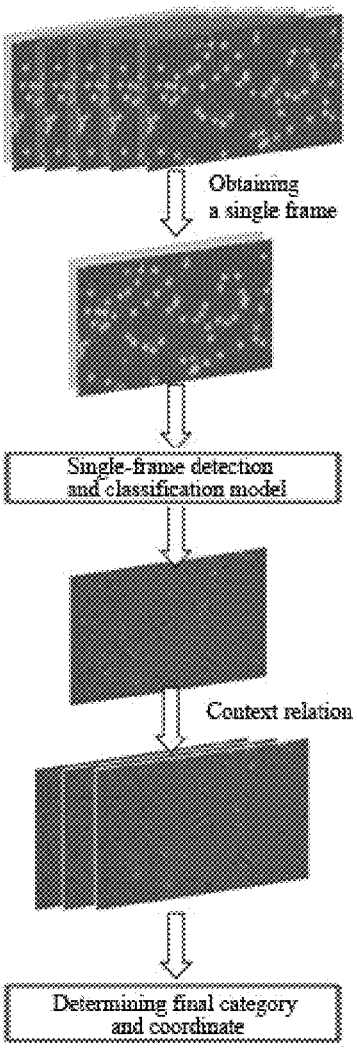
FIG. 2 is a schematic diagram of constructing model of the method for detecting urine formed elements based on deep learning and context relation.
Figure 3:
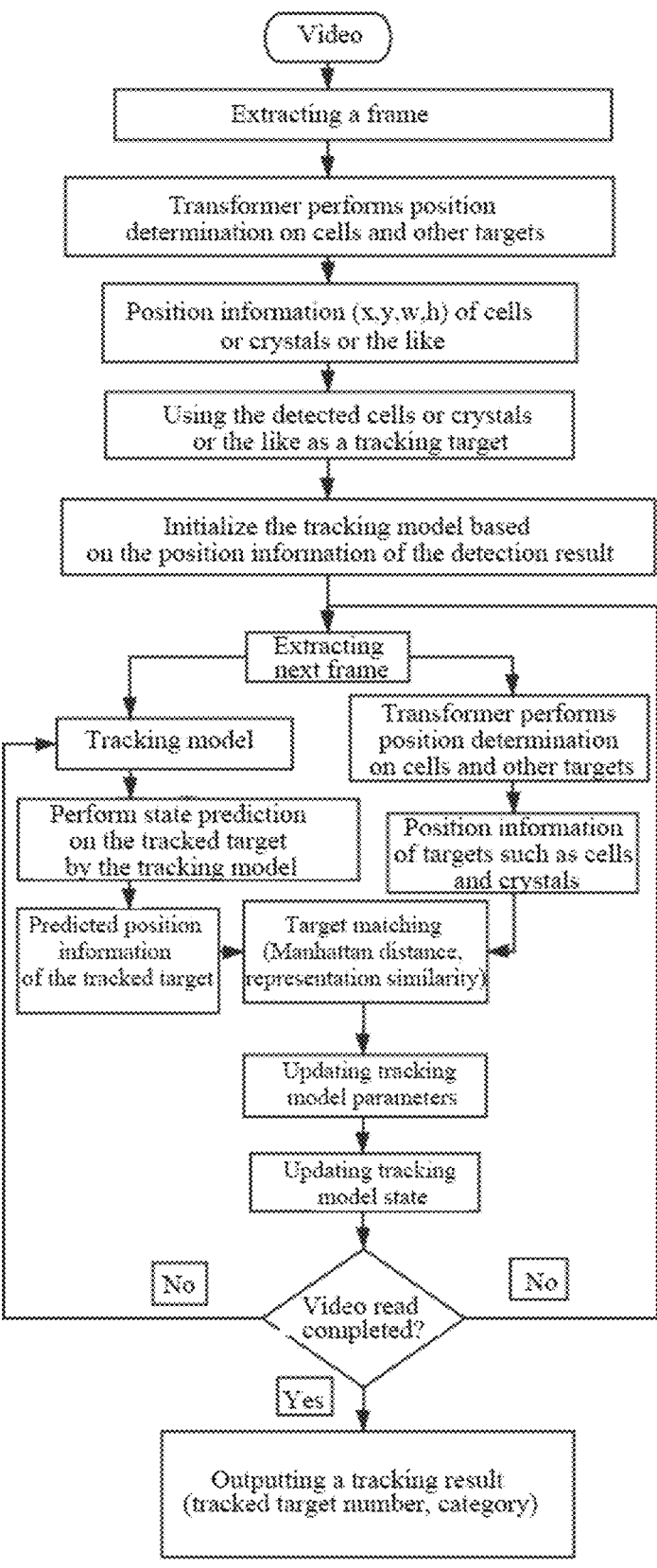
FIG. 3 is a flow diagram of the method for detecting urine formed elements based on deep learning and context relation.
Figure 4:
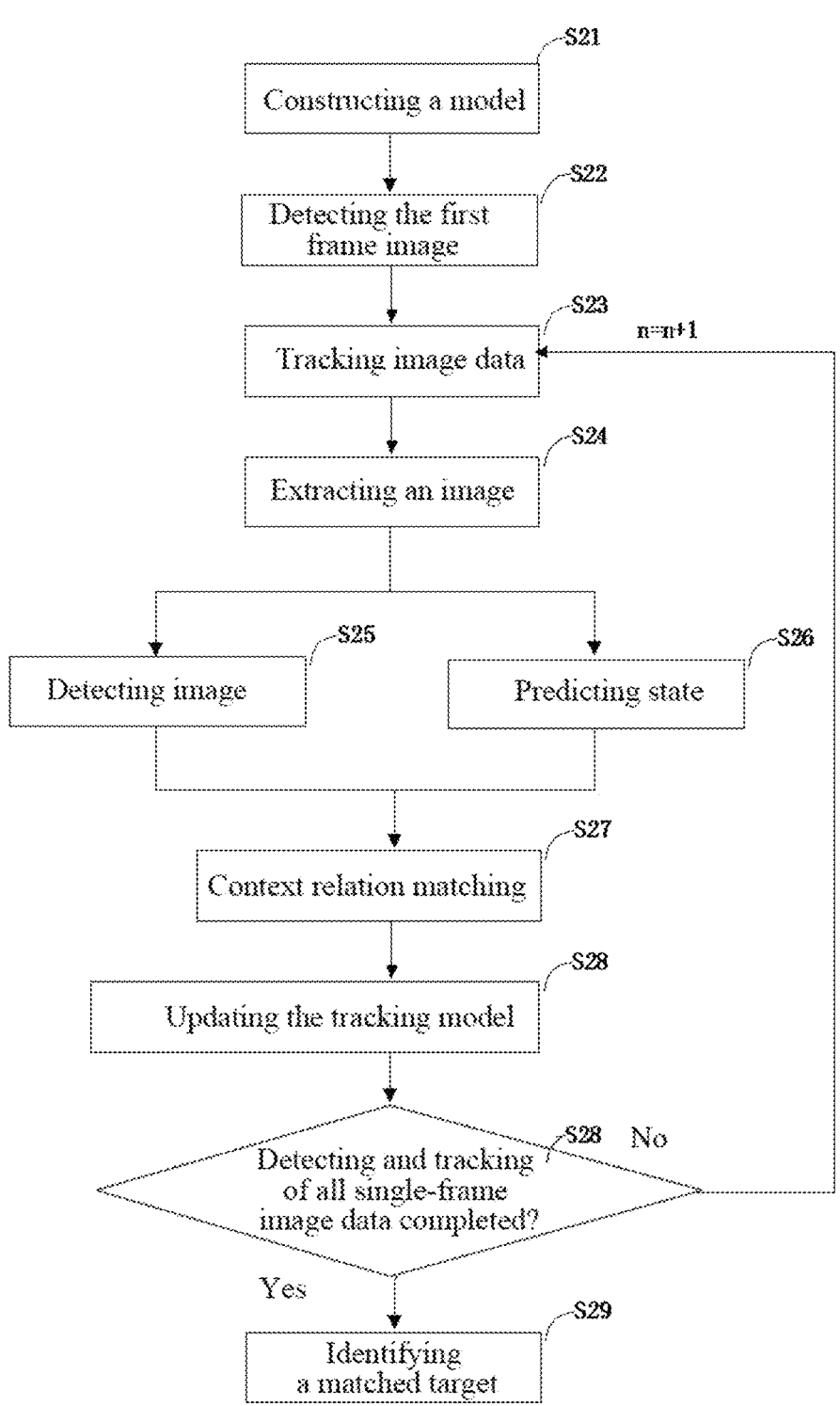
FIG. 4 is a flow diagram of Step S2 in Embodiment 2 of the method for detecting urine formed elements based on deep learning and context relation.
Figure 5:
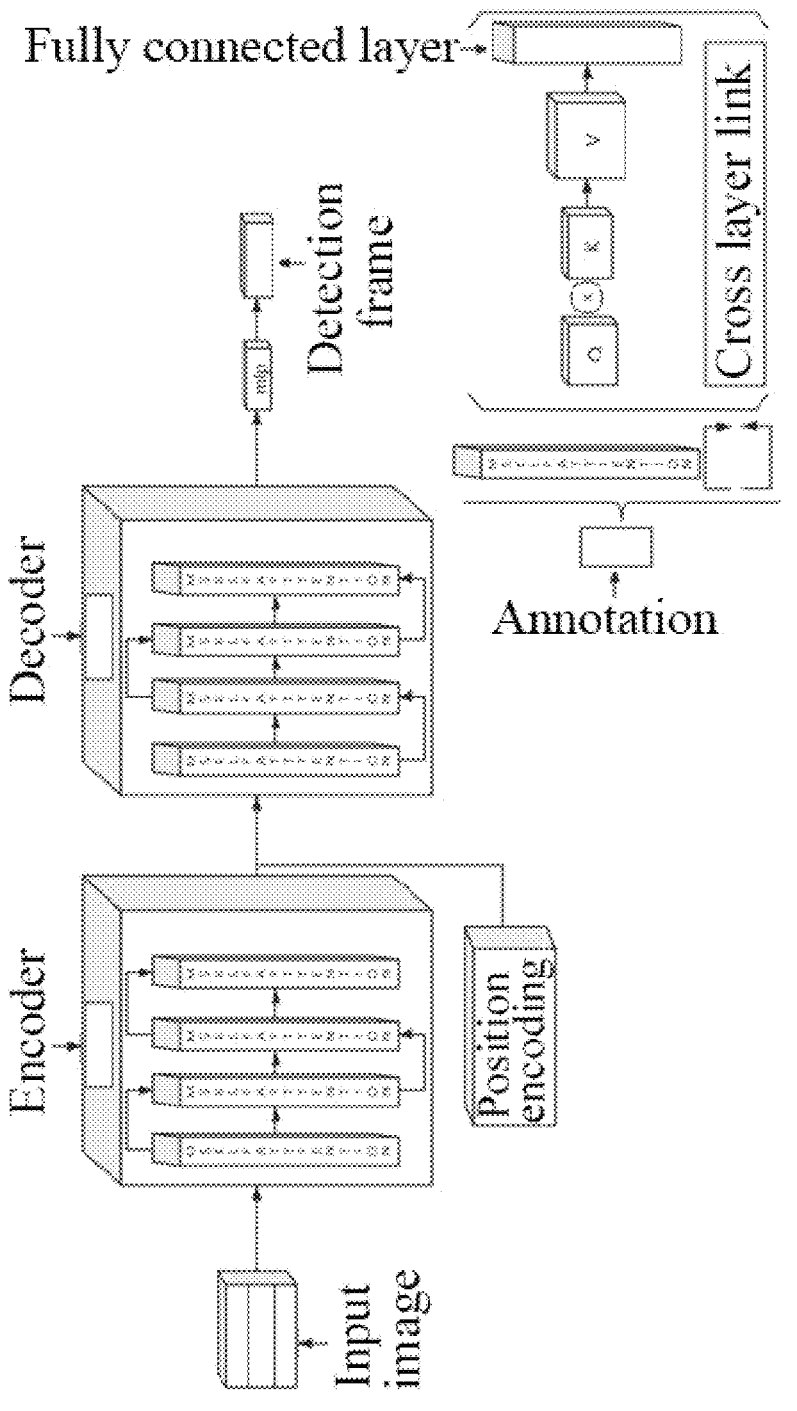
FIG. 5 is an architecture diagram of a Transformer detecting model of the method for detecting urine formed elements based on deep learning and context relation.
Figure 6:
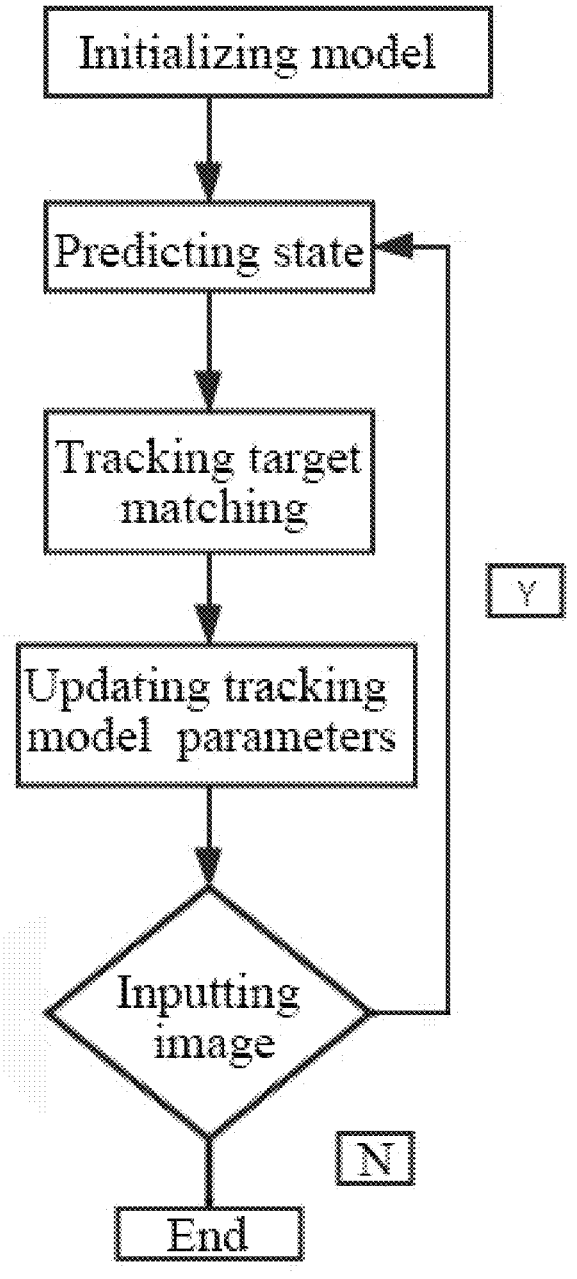
FIG. 6 is a flow diagram of a tracking model of the method for detecting urine formed elements based on deep learning and context relation.
Figure 7:
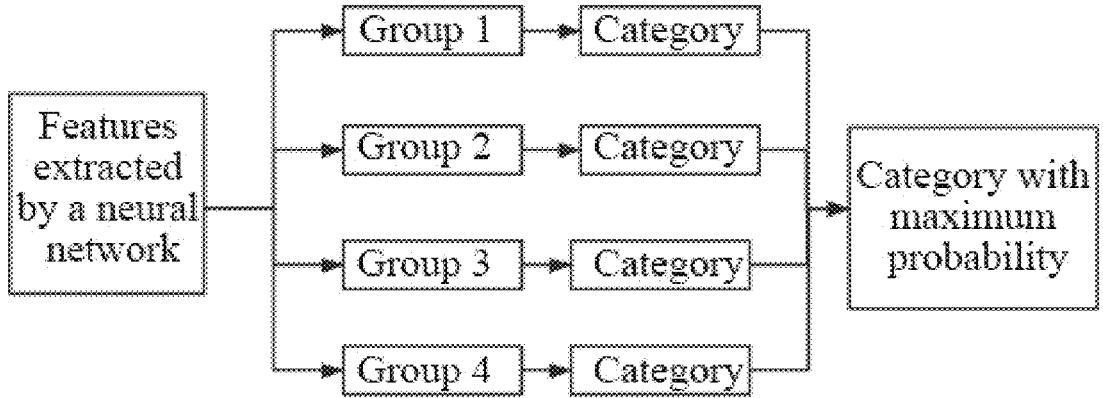
FIG. 7 is a flow diagram of identifying model of the method for detecting urine formed elements based on deep learning and context relation.
Figure 8:
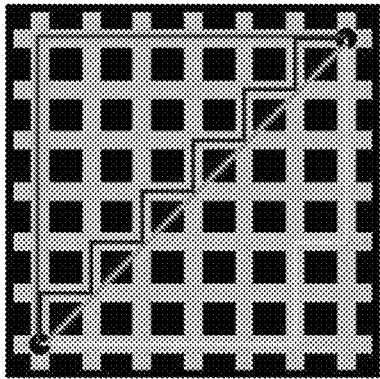
FIG. 8 is a schematic diagram of matching a Manhattan distance target of the method for detecting urine formed elements based on deep learning and context relation.
Figure 9:
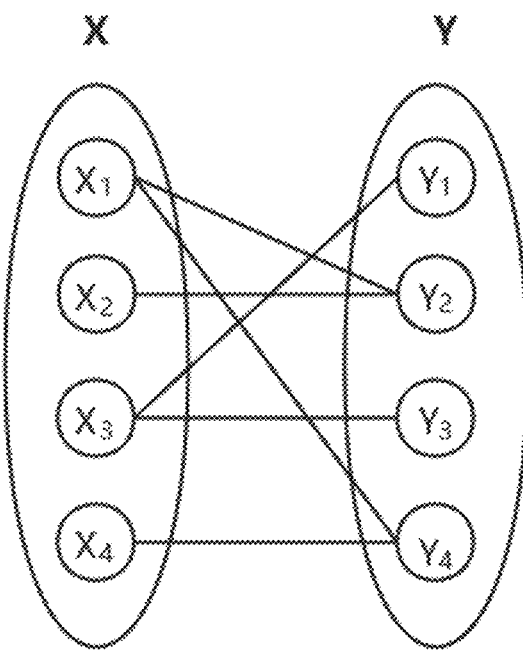
FIG. 9 is a schematic diagram of matching Hungarian algorithm target of the method for detecting urine formed elements based on deep learning and context relation.

As shown in FIGS. 1, 2, and 3, a method for detecting urine formed elements based on deep learning and context relation comprises the following steps:

S1, establishing a formed element dataset: performing video capture on annotated labeled urine sample in the visual field of a microscopic imaging device to obtain annotated labeled urine video; extracting an image from the labeled urine video to obtain single-frame image data with a time sequence n; and labeling position and category of a formed element on the single-frame image data to obtain the formed element dataset, and dividing the formed element dataset into a training set and a testing set;

S2, establishing a urine formed element detection and classification model: constructing a urine formed element detection and classification model with detecting, tracking, predicting, context relation matching, locating, and comparing and identifying functions, and using the training set and the testing set to train the model;

as shown in FIG. 4, Step S2 comprises the following steps:

S21, constructing model: constructing a Transformer detecting model, a tracking model, and an identifying model, and using the training set and the testing set to perform model training;

as shown in FIG. 5, the Transformer detecting model comprises an encoder, a decoder, and a multi-layer neural network mapping layer that are set sequentially;

the encoder comprises at least two multi-head self-attention modules connected sequentially, the encoder is used to divide the single-frame image data into k image blocks, which are linearly transformed into feature expression of the image blocks by a query matrix Qi, a value matrix Vi, and a keyword matrix Ki of the first multi-head self-attention module, the feature expression is superposed with a feature of the multi-head self-attention module and then input into the next multi-head self-attention module, until the final feature expression of the image blocks is obtained by the last multi-head self-attention module, and the final feature expression of the image blocks is superposed with position encoding to obtain a decoder input feature;

the decoder comprises at least one multi-head self-attention module connected sequentially, the decoder is used to decode the decoder input feature by at least two multi-head self-attention modules to obtain a decoded feature vector; and the multi-layer neural network mapping layer is used to calculate the decoded feature vector to obtain a corresponding feature vector, and linearly map to obtain the detection frame coordinate $(x_n, y_n, w_n, h_n)$ and the corresponding coordinate box change rate $(dx_n, dy_n, dw_n, dh_n)$;

the pixel of the single-frame image data is 608*608, wherein k is 16, and the pixel of the image block is 38*38;

the encoder comprises four multi-head self-attention modules connected sequentially, the decoder comprises four multi-head self-attention modules connected sequentially, and the multi-layer neural network is a three-layer fully connected layer neural network;

the detection result of the Transformer detecting model is:

$$PE_{(pos,2i)} = \sin(pos/10000^{2i/d_{model}})$$

$$PE_{(pos,2i+1)} = \cos(pos/10000^{2i/d_{model}});$$

wherein, $PE_{(pos,2i)}$ is image encoding of (pos, 2i), pos is a position number of a single-frame image in the entire image, i is a dimension of the position encoding, and $d_{model}$ is a total dimension of the positional encoding;

the detection result as an object to be matched for the tracking model is input into the tracking model; as shown in FIG. 6, the tracking model is a tracking model based on Kalman filtering prediction or a tracking model uses any one of the following algorithms: SSD algorithm, FPN algorithm, Fast R-CNN algorithm, faster R-CNN algorithm, mask R-CNN algorithm, efficentNet algorithm YOLO/v2/v3/v4/v5 algorithm and RetianNet algorithm;

the states of the Kalman filtering in the tracking model comprise: the center point coordinate $(x_n, y_n)$, the width and height of the detection frame $(w_n, h_n)$, the change rate of the center point coordinate $(dx_n, dy_n)$, and the change rate of the width and height of the detection frame $(dw_n, dh_n)$;

the tracking model adopts the following formula:

$$x_k = A^* x_{k-1} + B^* u_k + w_{k-1}$$

$$z_k = H^* x_k + v_k;$$

wherein, $x_k$ is a system state matrix, $z_k$ is a state matrix observation quantity, A is a state transition matrix, B is a control input matrix, H is a state observation matrix, $w_{k-1}$ is a process noise, and $v_k$ is a measurement noise;

as shown in FIG. 7, the identifying method of the identifying model is as follows:

A, grouping: dividing all the matching targets into four groups and setting an other category for each group respectively;

B, deducing: when a real category of a sample is in other groups, the category of this group is the other category, selecting the category with the highest probability within all groups;

S22, detecting the first frame image: detecting single-frame image data with a time sequence of 1 by the Transformer detecting model, to obtain a detection frame coordinate $(x_1, y_1, w_1, h_1)$ of a target and a corresponding coordinate box change rate $(dx_1, dy_1, dw_1, dh_1)$, wherein $(x_1, y_1)$ is a center point coordinate of a single-frame image with the time sequence of 1, $w_1$ is a width of a single-frame image detection frame with the time sequence of 1, and $h_1$ is a height of the single-frame image detection frame with the time sequence of 1; and the target comprises a cell and a crystal;

S23, tracking image data: inputting the detection frame coordinate $(x_1, y_1, w_1, h_1)$ and the coordinate box change rate $(dx_1, dy_1, dw_1, dh_1)$ into the tracking model to initialize the tracking model;

S24, extracting image: extracting single-frame image data with a time sequence of n, wherein n is 2 initially, then detecting image in Step S25, and predicting state in Step S26;

S25, detecting image: detecting the single-frame image data by the Transformer detecting model, to obtain a detection frame coordinate $(x_n, y_n, w_n, h_n)$ of a target and a corresponding coordinate box change rate $(dx_n, dy_n, dw_n, dh_n)$, and entering Step S27, wherein $(x_n, y_n)$ is a center point coordinate of a single-frame image with the time sequence of n, $w_n$ is a width of a single-frame image detection frame with the time sequence of n, and $h_n$ is a height of the single-frame image detection frame with the time sequence of n;

S26, predicting state: predicting the state of the detection frame coordinate of the previous single-frame image by the tracking model to obtain a detection frame predicted coordinate $(x_c, y_c, w_c, h_c)$, and entering Step S27;

S27, matching the context relation: matching the detection frame coordinate $(x_n, y_n, w_n, h_n)$ with the detection frame predicted coordinate $(x_c, y_c, w_c, h_c)$, and classifying the detection frame as a matching target, a possible missing target and a missing target according to the matching result;

the possible missing target is a target that is not matched for 5 times or less, the missing target is a target that is not matched for more than 5 times, and the missing target comprises a -moving-too-fast target and a defocused target;

as shown in FIGS. 8-9, the matching method comprises: an Manhattan distance calculation method, a representation similarity calculation method, and a Hungarian algorithm;

S28, updating the tracking model: inputting the matching target, the possible missing target, and the missing target into the tracking model for updating the tracking model, and determining whether all the single-frame image data detecting and tracking are completed, if not, n=n+1, returning to Step S24, and if yes, acquiring all matching targets;

S29, matching target identification: identifying all the matching targets by the identifying model to obtain type and quantity of the formed element, thus completing model training;

S3, detecting a to-be-detected urine: performing video capture on a to-be-detected urine sample in the visual field of the microscopic imaging device to obtain a to-be-detected urine video; extracting an image from the to-be-detected urine video to obtain single-frame image data with a time sequence n; after detecting, tracking, predicting, and context relation matching, locating and numbering all formed elements in the single-frame image data by the urine formed element detection and classification model, and after comparing the formed element with the formed element dataset, identifying the type and quantity of the formed element and outputting a final result, to complete the detection.

Embodiment 3

As shown in FIGS. 2-3, a method for detecting urine formed elements based on deep learning and context relation comprises the following steps:

1. Real-Time Collection of Urine Dynamic Videos Under Microscope

Firstly, photos of each visual field are taken under a microscopic imaging device, to generate a single visual field image with a time sequence.

2. Data Labeling of Urine Formed Elements

The position and category information of the formed elements on a sheet are labeled by professional doctors with a specific labeling tool. After a certain scale of labels are obtained, the labeled data is divided into a training set and a testing set in a certain proportion, to prepare data for constructing a neural network model.

3. Construction of a Detecting, Tracking and Identifying Model of Transformer Based Urine Formed Elements A context relation algorithm for detecting, tracking and identifying the urine formed elements is constructed.

3.1. Detecting Model

As shown in FIG. 5, a single-frame urine image detection and classification model is constructed.

Firstly, an image of 608*608 is input, and then equally divided into 16 parts according to the pixel size of 38*38. These 16 image blocks, as the image blocks of which attention coefficients are needed to be calculated, are sent into the "multi-head self-attention (M-SELF-ATTENTION)" modules of the encoder to calculate the correlations between this image block and other image blocks. For each image block, there is a query matrix Qi, a value matrix Vi, and a keyword matrix Ki. The operation rules of the "M-SELF-ATTENTION" module are as follows:

(1) For the current image block, its query matrix Qi is set and the 38*38 image block is vectorized as the value matrix Vi, a matrix operation is performed on Qi and Vi to obtain a linearly transformed query matrix Qi*.

(2) For other image blocks, the keyword matrices Ki are set separately, the current value matrix Vi is to perform the matrix operation on Ki and Vi to obtain linearly transformed keyword matrices Ki*.

(3) Based on Qi* calculated in (1), 16 matrices calculated based on (2) are combined into a large matrix K*, a correlation matrix W is obtained by a matrix multiplication operation of Q* and K*, and a correlation (0-1) between this image block and other image blocks is obtained by normalizing W.

(4) The correlation matrix is multiplied by the value matrix Vi of other image blocks to obtain weighted features based on the different image blocks. The features are mapped by a fully connected layer, to obtain a final feature expression of the image block, wherein the fully connected layer is used to control a feature dimension of the final expression.

(5) The final feature is superimposed with the features (or images) input into "multi-head self-attention", to obtain a new feature, which is used as an input of the next level of "multi-head self-attention". The above new feature is sent into the second level of the "multi-head self-attention" module.

The above operations are repeated, to obtain the final feature within the encoder. The entire encoding process performs four levels of "multi-head self-attention" calculation in total. Then, decoding is performed, and position information of the feature obtained by the encoder is encoded. The position code is "superposed" with the feature obtained by the encoder, to obtain a final input feature of a decoder. This feature is sent into the decoder containing four levels of "multi-head attention" operations in total, which is similar to the calculation process of the "multi-head attention" operation of the encoder. Finally, the decoder outputs a decoded feature vector. The feature vector is sent into the three-layer fully connected layer corresponding to the detection frame, to obtain a feature vector of this task. The feature vector is linearly mapped respectively, to obtain coordinate and confidence of the detection frame. A detection result is used as an object to be matched for the tracking model and input into the tracking model.

$$PE_{(pos,2i)}=\sin(pos/10000^{2i/d_{model}})$$

$$PE_{(pos,2i+1)}=\cos(pos/10000^{2i/d_{model}});$$

Wherein pos is a position number of the image block in the entire image, i is a dimension of the position code, and $d_{model}$ is a total dimension of the positional code 3.2. Tracking Model In each frame of the input video, based on effective information of the target obtained in 3.1, a tracking model based on Kalman filtering prediction is established, and the process is as shown in FIG. 6.

In addition to the model proposed in this embodiment, detection algorithms such as SSD, FPN, Fast R-CNN, faster R-CNN, mask R-CNN, efficentNet, YOLO/v2/v3/v4/v5, and RetianNet may also be comprised.

3.2.1. Tracking Model Initialization

The tracking model using Kalman filtering as the principle is constructed, and an initial tracking target is obtained from the first frame of the cell detection result obtained in 3.1. The detected position information (w, y, w, h) is used as an initialization state, to initialize the tracking model. The states of the selected model have eight state variables, comprising the center point coordinate (x, y), the width and height of the detection frame (w, h), the change rate of the center point coordinate (dx, dy), and the change rate of the width and height of the coordinate box (dw, dh). When parameters are initialized, conventional experience is used to initialize a state transition matrix and the like.

$$x_k=A^*x_{k-1}+B^*u_k+w_{k-1} \qquad (1)$$

$$z_k=H^*x_k+v_k \qquad (2)$$

3.2.2. Predicting State

Firstly, the model is already initialized in 3.2.1, and the tracking model predicts the state of the tracked target, to obtain a predicted target state of the model, namely new (w, y, w, h, dx, dy, dw, dh).

$x_k$→system state matrix, . . . , $z_k$→observation quantity of state matrix (actual measurement)

A→state transition matrix, . . . , B→control input matrix

H→state observation matrix $w_{k-1}$→process nois, . . . , $v_k$→measurement noise 3.2.3. Target Matching (Context Relation)

In each input frame, 3.1 is used to obtain the detected target to be matched in this frame, the detected target is matched with the predicted target, to obtain a result of pairwise matching. For the target tracked in the previous frame that does not have a matching object in this frame, it is marked as a "possible missing target". For the target that is detected in this frame but not matched with the target tracked in the previous frame, it is marked as a new tracking target, and its state is initialized by the Kalman filtering model. If a certain target is marked as the "possible missing target" for more than 5 frames, it is marked as a "missing target" and no longer be tracked.

Target Matching Method:

Manhattan Distance

As shown in FIG. 8, Manhattan distance—a distance between two points in the north-south direction plus a distance between the two points in the east-west direction, the screen is composed of pixels which are integers, and the coordinates of the points are also integers. Euclidean distance is a floating-point operation, which is slow in speed and has accumulated errors. The Manhattan distance only needs addition and subtraction, thus the efficiency is improved and errors are reduced.

Representation Similarity

Due to the randomness of Kalman filtering prediction, a matching method based on similarity calculation is introduced. A SiameseNet is used to calculate the similarity between the target detected in the current frame and the target tracked in the previous frame, to obtain the similarity between the different targets.

Hungarian Algorithm (Binary Matching)

As shown in FIG. 9, the Manhattan distance is used to perform distance calculation on the target detected in the current frame and the target tracked in the previous frame, to obtain a pairwise distance between different targets, a weight matrix of the Hungarian algorithm is obtained by weighting the distance with the representation similarity, and the pairwise matching of the optimal targets is performed, to obtain a matching result.

3.2.4. Updating the Tracking Model Parameter

For all tracked targets in this frame, its state and model parameters are updated. The parameters and state of the tracking model for the new tracked target are obtained, 3.2.2 to 3.2.4 is repeated until the end.

3.3. Identifying Model

The identifying model is based on the detection frame of 3.1, as shown in FIG. 7.

Due to the relatively small number of abnormal cells compared to all cells in the target, and the varying number of samples collected by the different abnormal cells, the number of cells in the foreground, background, and different categories follows long tail distribution, which seriously affects the identification performance of the model. A method of grouping classifiers is adopted to alleviate this situation.

The cells may be divided into four groups (comprising a background category) according to the different numbers.

Another category is added to the different groups, namely when a real category of a sample is in other groups, the category of this group is the other category.

The category with the highest probability within all groups is selected during deducing.

By adopting this method, the weight difference of the classifiers on different categories is relatively small, which effectively alleviate the serious impact of the long tail distribution on the identifying model.

4. Locating the Effective Component

Based on the above detecting, identifying, and tracking model, a unique id (id is started from zero and increased sequentially with the number of the tracked targets) is assigned to each tracked object and the category of the target is identified. Ultimately, the effective number and category of the cells in the urine may be obtained.

The above are only preferred specific implementations of the present application, but the scope of protection of the present application is not limited thereto. Any equivalent substitutions or changes, that are made by any of those skilled in the art, within the technical scope disclosed by the present application according to the technical solution and invention concepts thereof of the present application should all fall within the scope of protection of the present application.

INDUSTRIAL APPLICABILITY

The present application provides a method for detecting urine formed elements based on deep learning and context relation, to solve the problem of missed and repeated detection caused by the easily changed positions of the urine formed elements in the visual field of the microscope. Based on the Transformer technology, the Kalman filtering based target tracking technology is applied to count urine cells, the interference factors such as long tail distribution and light are fully considered, the above problem is solved while the balance between speed and accuracy is achieved, and the application has the clinical application value.

The invention claimed is:

1. A method for detecting urine formed elements based on deep learning and context relation, comprising the following steps:

S1, establishing a formed element dataset: performing video capture on a labeled urine sample in the visual field of a microscopic imaging device to obtain a labeled urine video; extracting an image from the labeled urine video to obtain single-frame image data with a time sequence n; and labeling position and category of a formed element on the single-frame image data to obtain the formed element dataset, and dividing the formed element dataset into a training set and a testing set;

S2, establishing a urine formed element detection and classification model: constructing a urine formed element detection and classification model with detecting, tracking, predicting, context relation matching, locating, and comparing and identifying functions, and using the training set and the testing set to train the model;

S3, detecting a to-be-detected urine: performing video capture on a to-be-detected urine sample in the visual field of the microscopic imaging device to obtain a to-be-detected urine video; extracting an image from the to-be-detected urine video to obtain single-frame image data with a time sequence n; after detecting, tracking, predicting, and context relation matching, locating and numbering all formed elements in the single-frame image data by the urine formed element detection and classification model, and after comparing the formed element with the formed element dataset, identifying the type and quantity of the formed element and outputting a final result, to complete the detection wherein:

Step S2 comprises:

S21, constructing model: constructing a Transformer detecting model, a tracking model, and an identifying model, and using the training set and the testing set to perform model training;

S22, detecting the first frame image: detecting single-frame image data with a time sequence of 1 by the Transformer detecting model, to obtain a detection frame coordinate $(x_1, y_1, w_1, h_1)$ of a target and a corresponding coordinate box change rate $(dx_1, dy_1, dw_1, dh_1)$, wherein $(x_1, y_1)$ is a center point coordinate of a single-frame image with the time sequence of 1, $w_1$ is a width of a single-frame image detection frame with the time sequence of 1, and $h_1$ is a height of the single-frame image detection frame with the time sequence of 1;

S23, tracking image data: inputting the detection frame coordinate $(x_1, y_1, w_1, h_1)$ and the coordinate box change rate $(dx_1, dy_1, dw_1, dh_1)$ into the tracking model to initialize the tracking model;

S24, extracting image: extracting single-frame image data with a time sequence of n, wherein n is 2 initially, then detecting image in Step S25, and predicting state in Step S26;

S25, detecting image: detecting the single-frame image data by the Transformer detecting model, to obtain a detection frame coordinate $(x_n, y_n, w_n, h_n)$ of a target and a corresponding coordinate box change rate $(dx_n, dy_n, dw_n, dh_n)$, and entering Step S27, wherein $(x_n, y_n)$ is a center point coordinate of a single-frame image with the time sequence of n, $w_n$ is a width of a single-frame image detection frame with the time sequence of n, and $h_n$ is a height of the single-frame image detection frame with the time sequence of n;

S26, predicting state: predicting the state of the detection frame coordinate of the previous single-frame image by the tracking model to obtain a detection frame predicted coordinate $(x_c, y_c, w_c, h_c)$, and entering Step S27;

S27, matching the context relation: matching the detection frame coordinate $(x_n, y_n, w_n, h_n)$ with the detection frame predicted coordinate $(x_n, y_n, w_n, h_n)$, and classifying the detection frame as a matching target, a possible missing target and a missing target according to the matching result;

S28, updating the tracking model: inputting the matching target, the possible missing target, and the missing target into the tracking model for updating the tracking model, and determining whether all the single-frame image data detecting and tracking are completed, if not, n=n+1, returning to Step S24, and if yes, acquiring all matching targets; and S29, matching target identification: identifying all the matching targets by the identifying model to obtain and then output the type and quantity of the formed element, thus completing model training.

2. The method for detecting urine formed elements based on deep learning and context relation according to claim 1, wherein: in Step S21, the Transformer detecting model comprises an encoder, a decoder, and a multi-layer neural network mapping layer that are set sequentially;

the encoder comprises at least two multi-head self-attention modules connected sequentially, the encoder is used to divide the single-frame image data into k image blocks, which are linearly transformed into feature expression of the image blocks by a query matrix Qi, a value matrix Vi, and a keyword matrix Ki of the first multi-head self-attention module, the feature expression is superposed with a feature of the multi-head self-attention module and then input into the next multi-head self-attention module, until the final feature expression of the image blocks is obtained by the last multi-head self-attention module, and the final feature expression of the image blocks is superposed with position encoding to obtain a decoder input feature;

the decoder comprises at least one multi-head self-attention module connected sequentially, the decoder is used to decode the decoder input feature by at least two multi-head self-attention modules to obtain a decoded feature vector; and the multi-layer neural network mapping layer is used to calculate the decoded feature vector to obtain a corresponding feature vector, and linearly map to obtain the detection frame coordinate $(x_n, y_n, w_n, h_n)$ and the corresponding coordinate box change rate $(dx_n, dy_n, dw_n, dh_n)$.

3. The method for detecting urine formed elements based on deep learning and context relation according to claim 2, wherein: the pixel of the single-frame image data is 608*608, wherein k is 16, and the pixel of the image block is 38*38;

the encoder comprises four multi-head self-attention modules connected sequentially, the decoder comprises four multi-head self-attention modules connected sequentially, and the multi-layer neural network is a three-layer fully connected layer neural network;

the detection result of the Transformer detecting model is:

$$PE_{(pos,2i)}=\sin(pos/10000^{2i/d_{model}})$$

$$PE_{(pos,2i+1)}=\cos(pos/10000^{2i/d_{model}});$$

wherein, $PE_{(pos,2i)}$ is image encoding of (pos, 2i), pos is a position number of a single-frame image in the entire image, i is a dimension of the position encoding, and $d_{model}$ is a total dimension of the positional encoding; and the detection result as an object to be matched for the tracking model is input into the tracking model.

4. The method for detecting urine formed elements based on deep learning and context relation according to claim 1, wherein: in Step S21, the tracking model is a tracking model based on Kalman filtering prediction or a tracking model uses any one of the following algorithms: SSD algorithm, FPN algorithm, Fast R-CNN algorithm, faster R-CNN algorithm, mask R-CNN algorithm, efficentNet algorithm, YOLO/v2/v3/v4/v5 algorithm and RetianNet algorithm.

5. The method for detecting urine formed elements based on deep learning and context relation according to claim 4, wherein: in Step S21, the states of the Kalman filtering in the tracking model comprise: the center point coordinate $(x_n, y_n)$, the width and height of the detection frame $(w_n, h_n)$, the change rate of the center point coordinate $(dx_n, dy_n)$, and the change rate of the width and height of the detection frame $(dw_n, dh_n)$.

6. The method for detecting urine formed elements based on deep learning and context relation according to claim 1, wherein: in Step S21, the tracking model adopts the following formula:

$$x_k=A^*x_{k-1}+B^*u_k+w_{k-1}$$

$$z_k=H^*x_k+v_k;$$

wherein, $x_k$ is a system state matrix, $z_k$ is a state matrix observation quantity, A is a state transition matrix, B is a control input matrix, H is a state observation matrix, $w_{k-1}$ is a process noise, and $v_k$ is a measurement noise.

7. The method for detecting urine formed elements based on deep learning and context relation according to claim 1, wherein: in Step S22, the target comprises a cell and a crystal.

8. The method for detecting urine formed elements based on deep learning and context relation according to claim 1, wherein:

in Step S27, the possible missing target is a target that is not matched for 5 times or less, the missing target is a target that is not matched for more than 5 times, and the missing target comprises a moving-too-fast target and a defocused target; and the matching method comprises: a Manhattan distance calculation method, a representation similarity calculation method, and a Hungarian algorithm.

9. The method for detecting urine formed elements based on deep learning and context relation according to claim 1, wherein: in Step S21, the identifying method of the identifying model is as follows:

A, grouping: dividing all the matching targets into four groups and setting another category for each group respectively; and B, deducing: when a real category of a sample is in other groups, the category of this group is the other category, selecting the category with the highest probability within all groups.

\* \* \* \* \*